United States Patent
Behiels

(10) Patent No.: US 7,650,046 B2
(45) Date of Patent: Jan. 19, 2010

(54) METHOD OF CORRECTING ARTIFACTS IN AN IMAGE SIGNAL

(75) Inventor: Gert Behiels, Mechelen (BE)

(73) Assignee: Agfa HealthCare, Mortsel (BE)

( * ) Notice: Subject to any disclaimer, the term of this patent is extended or adjusted under 35 U.S.C. 154(b) by 642 days.

(21) Appl. No.: 11/202,945

(22) Filed: Aug. 12, 2005

(65) Prior Publication Data

US 2006/0045378 A1 Mar. 2, 2006

Related U.S. Application Data

(60) Provisional application No. 60/610,138, filed on Sep. 15, 2004.

(30) Foreign Application Priority Data

Aug. 31, 2004 (EP) .................................. 04104170

(51) Int. Cl.
*G06K 9/40* (2006.01)
(52) U.S. Cl. ........................... 382/275; 382/7; 382/269; 378/207
(58) Field of Classification Search .................. 382/275
See application file for complete search history.

(56) References Cited

U.S. PATENT DOCUMENTS

| | | | |
|---|---|---|---|
| 4,490,846 A * | 12/1984 | Ishida et al. ................. 382/135 |
| 4,939,759 A | 7/1990 | Rupp et al. |
| 6,642,535 B2 | 11/2003 | Gebele et al. |
| 6,655,836 B2 * | 12/2003 | Boehm et al. ............... 378/207 |
| 7,164,807 B2 * | 1/2007 | Morton ........................ 382/269 |
| 2001/0052582 A1 | 12/2001 | Isoda |
| 2003/0111620 A1 | 6/2003 | Gebele et al. |

FOREIGN PATENT DOCUMENTS

EP 1 136 842 A2 9/2001

OTHER PUBLICATIONS

European Search Report in 04 10 4170 (Jan. 26, 2005).

* cited by examiner

*Primary Examiner*—Samir A. Ahmed
*Assistant Examiner*—Tsung-Yin Tsai
(74) *Attorney, Agent, or Firm*—Leydig, Voit & Mayer, Ltd.

(57) ABSTRACT

An artifact profile signal is generated representing an estimation of the contribution of artifacts to a reference signal G comprising these artifacts, in regions defined around the position of artifact generating element(s). Signal portions in these regions are extracted from the image signal. The artifact profile signal is deformed so as to generate a new artifact profile signal which is used for correction of the image signal that has been subjected to the above extraction.

4 Claims, 8 Drawing Sheets

METHOD OF CORRECTING ARTIFACTS IN AN IMAGE SIGNAL

CROSS-REFERENCE TO RELATED PATENT APPLICATIONS

This application claims the benefit of U.S. Provisional Application No. 60/610,138 filed Sep. 15, 2004, which is incorporated by reference. In addition, this application claims the benefit of European Application No. 04104170.8 filed Aug. 31, 2004, which is also incorporated by reference.

FIELD OF THE INVENTION

The present invention relates to a method to suppress joint artifacts present in radiographic images which are represented by a digital image signal obtained by means of a digitizing system in which an array of microlenses is used for light collection. The joint artifacts are located at the joint of two neighbouring sub-arrays of microlenses.

BACKGROUND OF THE INVENTION

In computed radiography nowadays radiation images originating from exposure of an object or a patient to penetrating radiation such as X-rays are often temporarily stored in a photostimulable phosphor plate instead of an x-ray film.

A digital signal representation of a radiation image which is temporarily stored in such a photostimulable phosphor plate is obtained by scanning the plate with stimulating radiation and converting image-wise modulated light which is emitted by the plate upon stimulation into a digital signal representation.

The image-wise modulated light emitted upon stimulation is focussed for example by means of an array of microlenses onto an array of transducers converting light into an electric signal. This electric signal is finally digitized.

An example of such a read out system integrated in a cassette conveying a photo stimulable phosphor screen has been described for example in US2003/0111620 and in U.S. Pat. No. 6,642,535.

Microlenses can for example be obtained from LIMO-Lissotschenko Mikrooptik, Hauert 7, 44227 Dortmunt, Germany.

Digital radiographic images digitized by a digitizer system as described higher in which a microlens array is used, are usually calibrated and corrected for remaining periodic variation.

At present current technology is capable of producing only microlens arrays of limited width.

To be able to digitize a complete line of a typical computed radiography imaging plate several microlens arrays are assembled into a larger microlens array having a width that is large enough to digitize a line of an imaging plate of commonly used dimensions.

After application of the current calibration and correction techniques, artifacts at the position of these joints remain visible.

The origin of the joint artifacts lies in the fact that several microlens arrays are assembled into a larger array. At the joints of the microlens arrays, the glue between has a different refractive index. Hence, the paths that the emitted light follows cross the glue. This causes ghost signals in the neighboring microlens elements. To avoid this ghost effect, the edges of the microlens arrays are blackened, which causes signal loss at both ends of the joints. This effect changes dependent on the focus distance, time and temperature.

It is an aspect of the present invention to provide a method to suppress these joint artifacts to an extent that they are no longer noticeable.

Although the invention will be described with reference to a read out system using an array of microlenses, the present invention can also be applied to correct signals containing artifacts having other causes. The invention can for example be used to correct full leg-full spine images, more specifically to filter out the overlap between different sub-parts of such an image.

SUMMARY OF THE INVENTION

The above aspect of the present invention is realised by a method as set out in the appending claims.

Particular embodiments of the present invention will be described in detail with reference to the following drawings.

DETAILED DESCRIPTION OF THE INVENTION

This invention relates to digital medical imaging. The invention will be explained with reference to a particular application in which an image signal representing a radiation image is generated by two-dimensionally scanning an exposed photostimulable phosphor plate with light and by digitizing image-wise modulated light emitted by the plate upon stimulation by the scanning light. The emitted light is collected and guided towards an array of transducer elements by means of an array of microlenses.

Such a system uses static calibration and periodic artifact suppression to obtain a calibrated signal. However, this procedure is not sufficient at the regions where two microlens arrays are glued together. The signal at the position of these joints changes differently with respect to focus distance, temperature and instability of the system over time.

To illustrate this effect, a computer simulation has been performed of the presence of a joint in a microlens array. The results are displayed in FIG. 1.

Figure 1:
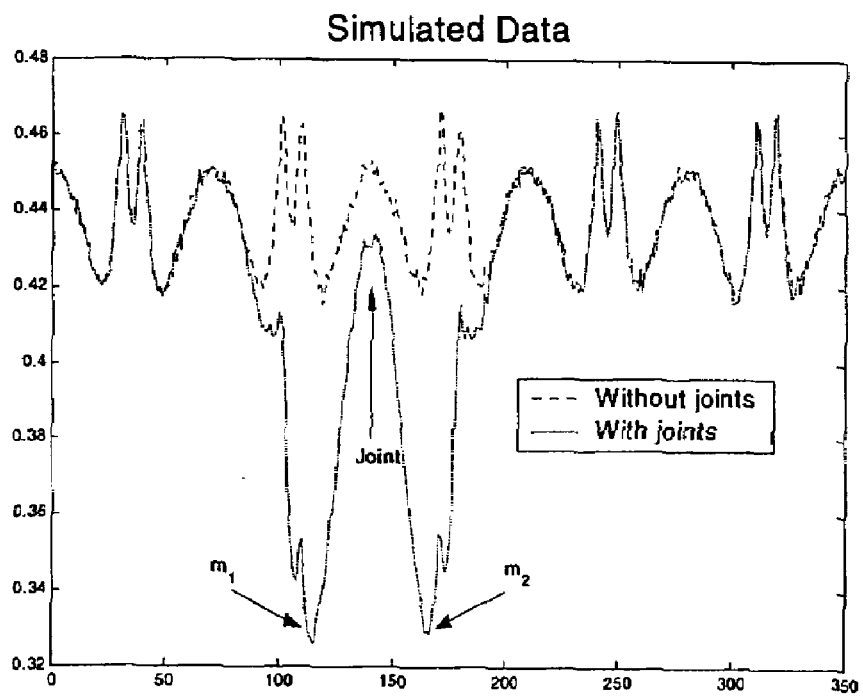
FIG. 1 shows computer simulated data corresponding with the signal which would be obtained if a homogeneous emitting object was placed in focus for the microlens system, with and without joints being present, before calibration.

FIG. 1 shows computer simulated data corresponding with the signal which would be obtained if a homogeneous emitting object was placed in focus for the microlens system, with and without joints being present, before calibration.

Significant signal loss is found at positions $m_1$ and $m_2$ at both sides of the joint.

Figure 2:
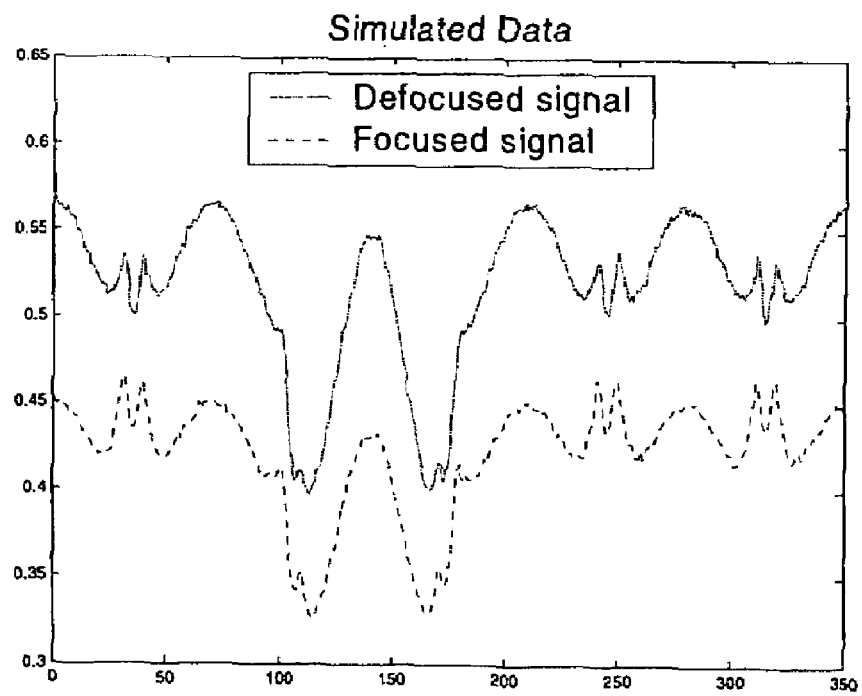
FIG. 2 shows simulated data for focused and defocused signal at joint positions.
Figure 3:
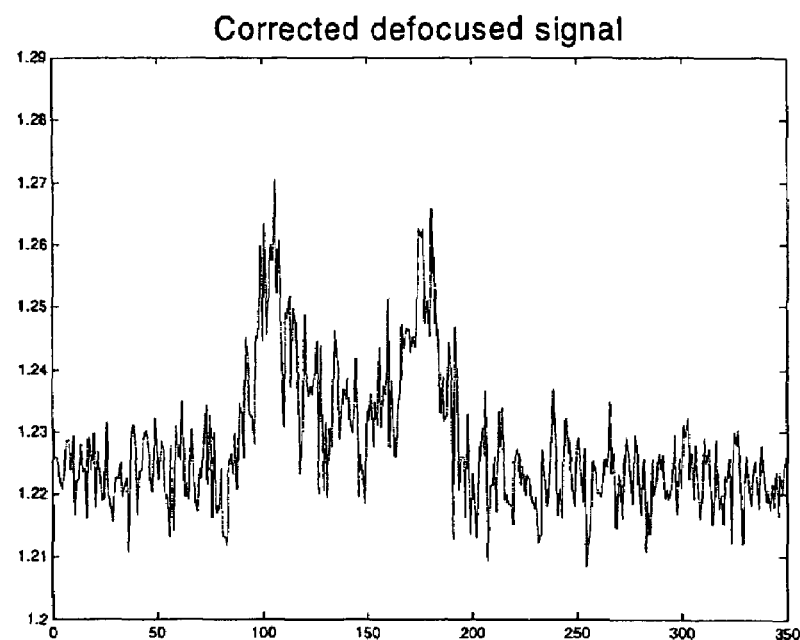
FIG. 3 is a flow chart illustrating the method of the present invention in the total context of the image flow.

Another simulation is performed to investigate the behaviour of the system for a light emitting object placed out of focus, with respect to the reference line shown in FIG. 1. The results are displayed in FIG. 2. It is normal practice to calibrate the unfocused signal with the reference signal shown in FIG. 1 (with joints, this signal is also called multiplicative calibration signal). The result of this calibration is shown in FIG. 3.

Because of the non linear nature of the phenomenon, the corrected signal, after calibration and microlens stripe correction, shows some artefact at the left and right of the joint position.

It is the aim of the invention to suppress these artifacts. This is performed by means of a method which aims to suppress only joint artifacts, hereby preserving as much diagnostic information as possible. Therefore, no explicit assumptions about the input signal are performed.

Figure 4:
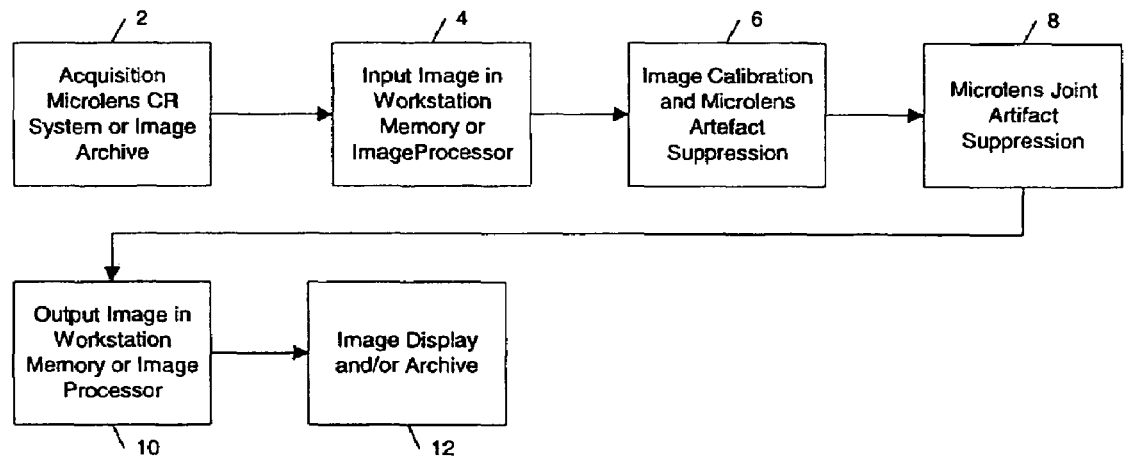
FIG. 4 is a flowchart depicting the basic steps of the joint artifact suppression algorithm of the present invention.

FIG. 4 shows a typical workflow applied when reading out and digitizing an image from a photostimulable phosphor plate in a digitizer system using a microlens array (referred to as aquisition microlens CR system). This figure illustrates the joint artifact suppression method of the present invention applied in this workflow.

In step 2, an image is acquired from a digitizer or read from an image archive, and loaded into the memory of a workstation or image processor in step 4.

In step 6, pre-processing algorithms are performed such as calibration and microlens gridline suppression thereby ensuring that the only artifacts that remain in the image are joint artifacts.

After this first correction step, the joint artifact suppression algorithm according to the present invention modifies the image in step 8 to suppress all joint related artifacts.

The output of the algorithm in step 10 is then prepared for display or archiving.

Figure 5:
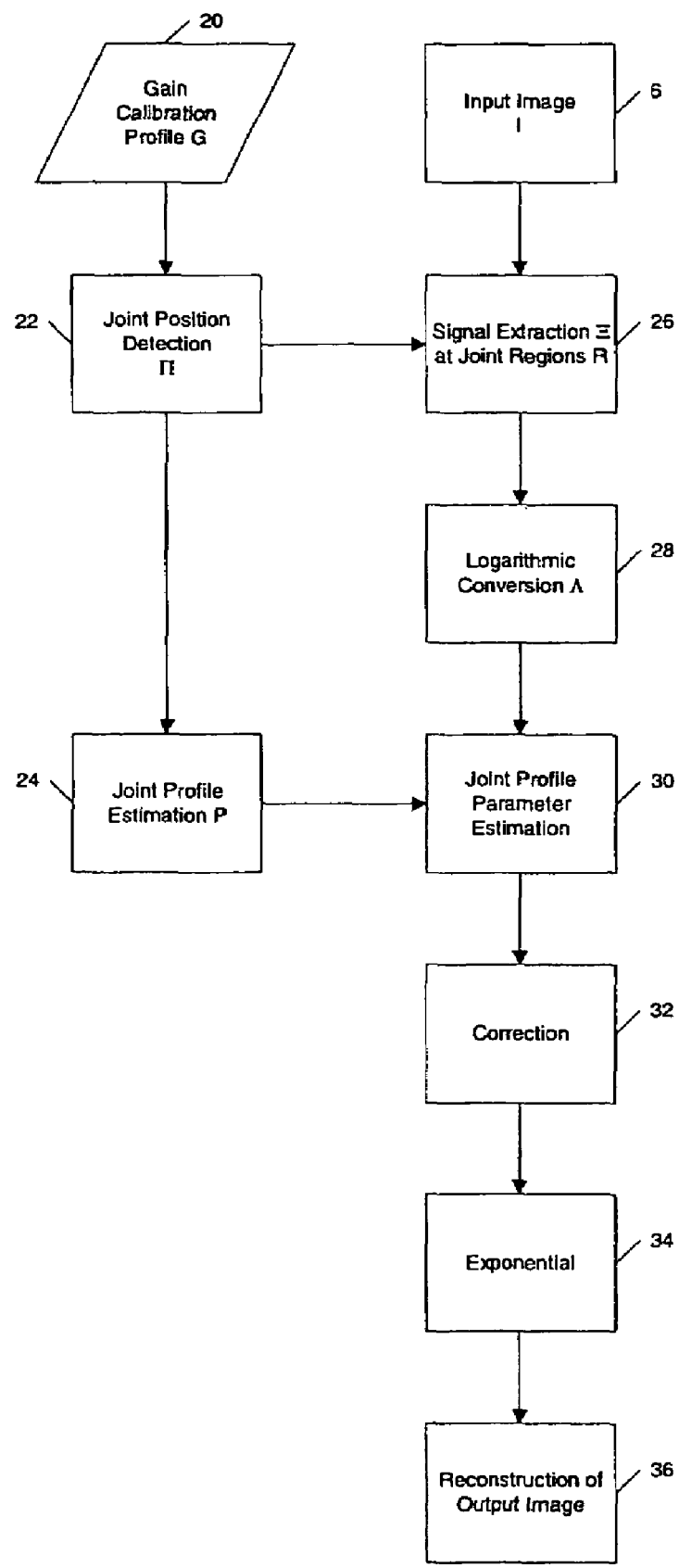
FIG. 5 is a flowchart illustrating the joint detection algorithm.

The basic steps of the joint artifact suppression algorithm of step 8 are shown in FIG. 5.

First the positions of the joints are determined in step 22. These positions are computed from a multiplicative calibration signal G.

Such a multiplicative calibration signal is a characteristic signal for each individual digitizing apparatus and can be obtained by the steps of (1) performing a scan without a phosphor plate being present so as to obtain an offset signal for each pixel, followed by (2) performing a scan of a phosphor plate which has been subjected to a flat field exposure and (3) averaging the signals pertain to each of the scanned lines of the flat field exposure and (4) subtracting the offset signal from the result of the averaging operation.

The contribution of the joint's presence to the calibration signal G in the disturbed regions R around the joint positions is estimated in step 24. These contributions are called 'joint profiles P'.

If the joint positions $\pi$ are known, the regions R which are disturbed by the presence of the joints are extracted from the input image I in step 26.

Because the artifact has a multiplicative nature, the extracted signals $\Xi$ at regions R are converted in step 28 using the logarithmic function to convert it into an additive problem. The signals $\Xi$ are transformed to their logarithmic parts $\Lambda$.

After extraction of the relevant image part, the parameters to deform the estimated joint profile are computed. This is done for each row and each joint.

After parameter estimation in step 30, new joint profiles are computed in step 32 from the estimated parameters and used to correct the extracted image part $\Lambda$.

The corrected image parts C of step 32 are used, after conversion to the original intensity frame with an exponential function in step 34, to replace the corresponding parts in the input image to produce an output image $\bigcirc$.

Step 22 of the algorithm is performed automatically and computed for each correction. Since the position of the joints do not vary in time, it is possible to compute or determine the positions of the joints in advance and store them for future use.

Figure 6:
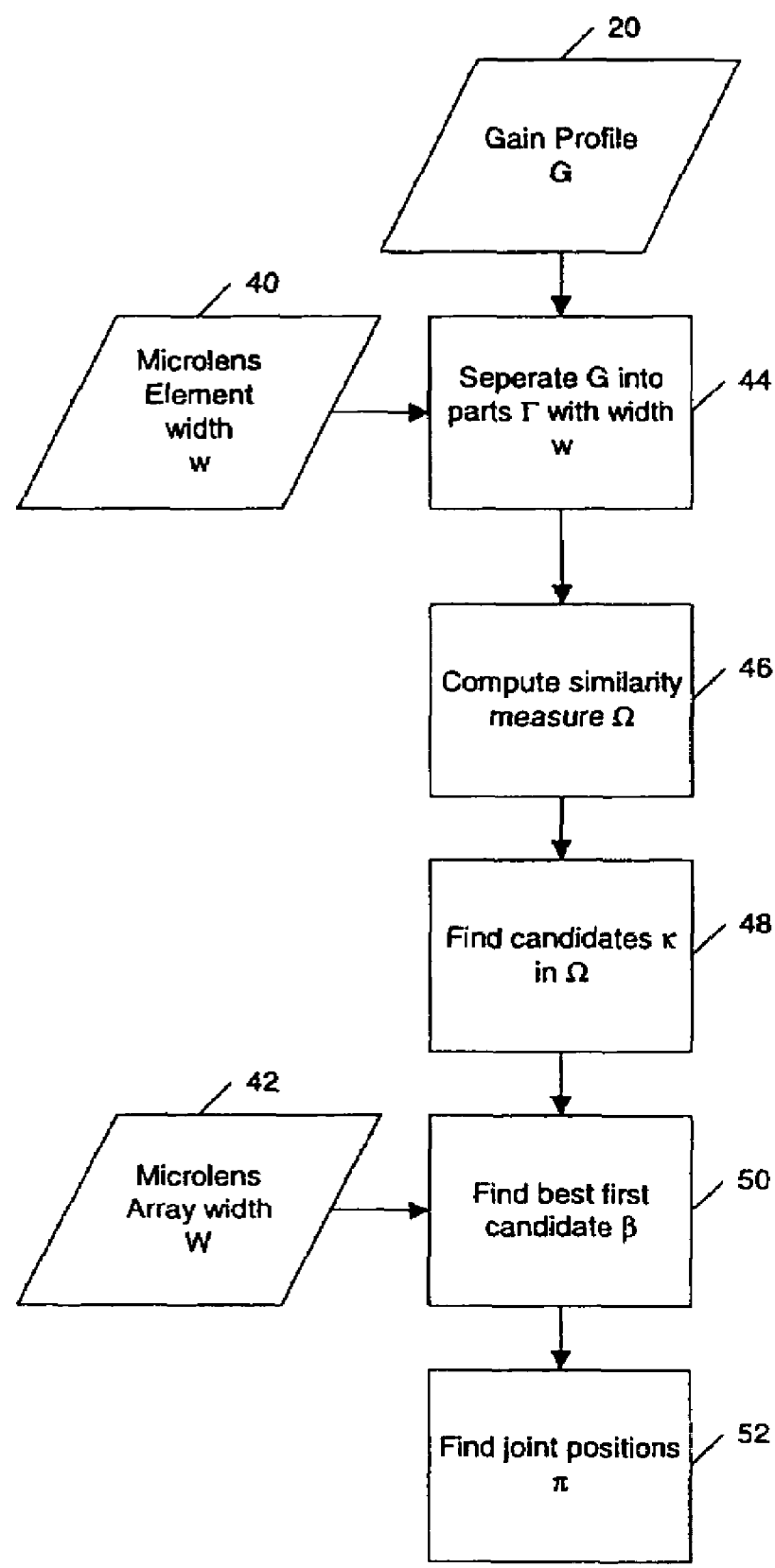
FIG. 6 is a flowchart depicting the basic steps to estimate the contribution of a joint to the calibration data.

The automatic detection algorithm of the joint positions is given in FIG. 6.

Step 44 of the algorithm consists of separating the input profile G into parts $\Gamma_i$ with width w, the width of one microlens element in the array given in step 40:

$$\Gamma_i = [g_{iw}, g_{iw+1} \cdots g_{(i+1)w-1}]$$

where $g_j$ is the jth element of the input profile G.

In step 46, a similarity measure $\Omega$ is computed between $\Gamma_i$ and $\Gamma_{i+1}$ for all parts. Several similarity measure can be used, e.g. correlation, matched filters, . . .

If correlation is chosen, the similarity measure $\Omega$ of step 46 is defined as $$\Omega = [\omega_1, \omega_2, \ldots, \omega_1, \ldots] \quad \text{Equation 1}$$

$$\omega_i = \frac{(\Gamma_i - \overline{\Gamma_i})(\Gamma_{i+1} - \overline{\Gamma_{i+1}})^T}{\sqrt{(\Gamma_i - \overline{\Gamma_i})(\Gamma_i - \overline{\Gamma_i})^T (\Gamma_{i+1} - \overline{\Gamma_{i+1}})(\Gamma_{i+1} - \overline{\Gamma_{i+1}})^T}}$$

wherein $\overline{o}$ is the mean of vector $o$. The candidates in step 48 can be found by inspection of the similarity measure $\Omega$.

If equation 1 is used as similarity measure $$\kappa = [iw] : \omega_i < \epsilon_1 \quad \text{Equation 2}$$

can be used to define possible candidates as initial guesses for the joint positions in the calibration profile G, wherein $\epsilon_1$ is a predefined threshold.

If we know the width W of the microlens array, the best first candidate $\beta$ of step 50 is found using the following formula $$\beta = \underset{i \in [0, 1, \ldots, \frac{W}{w}]}{\arg\max} |[iw, iw+W, iw+2W, \ldots] \cap \kappa| \quad \text{Equation 3}$$

where $|o|$ is defined as the cardinal number or number of elements in $o$.

Having found the best candidate $\beta$ for the first joint position, we compute the joint positions $\pi_i$ as the mean of 2 distinct minima $m_1$ and $m_2$ in regions with a width of 4 times the microlens element width w and centered on the positions $$[\beta w, \beta w + W, \beta w + 2W, \ldots]$$

of the gain profile G.

This concludes step 22 of FIG. 5.

If we have found the positions of the joints $\pi_i$, we are able to define the regions $R_i$ which are disturbed by the presence of the joint. Experiments have shown that the effect spreads only to the neighboring microlens element. The regions disturbed by the presence of the joints are then defined as $$R_i=[\pi_i-w, \pi_i-w+1, \ldots, \pi_i+w-1]$$ Equation 4

Figure 7:
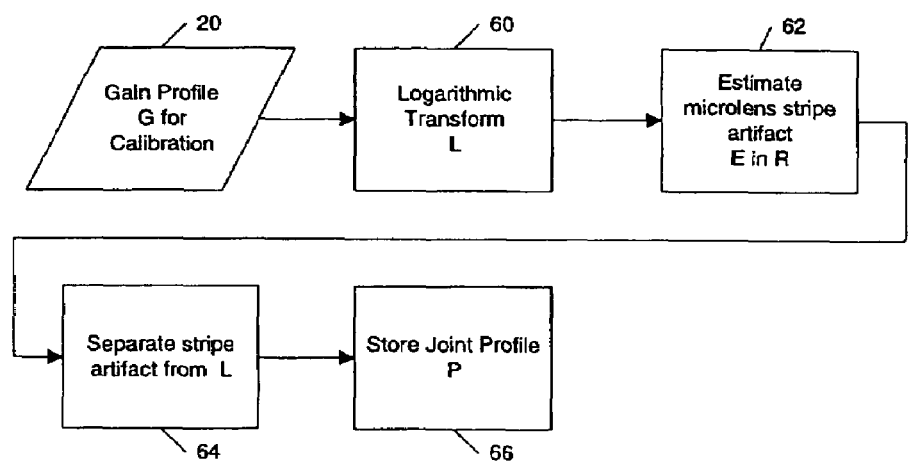
FIG. 7 is a flowchart illustrating the parameter estimation of the joint profiles and the correction of the image regions disturbed by the presence of a joint.

In step 24 of the algorithm of FIG. 5, we estimate the joint profiles $P_i$ in the regions $R_i$. More details of the steps are shown in FIG. 7.

In step 60, we first perform a logarithmic transformation on the gain profile G to convert the multiplicative problem into an additive problem.

$$L=\log(G)$$

There exist a large number of methods for estimation of the microlens stripe artifact in step 62. The most obvious choice to estimate this stripe artifact contribution is extrapolation of the neighboring signals. Other more advanced techniques for microlens stripe artifact correction are e.g. described in copending European patent application 04 102 185.8 filed May 18, 2004.

To clarify what is meant by estimation of the microlens stripe artifact in step 62, we work out the case of extrapolation.

The estimate of the stripe artefact in $R_i$ of step 62, is computed using the following formulas $$E_i^{left} = [l_{\pi_i-2w} \ldots l_{\pi_i-w-1}] - \left(l_{\pi_i-2w} + [0 \ldots w-1]\frac{(l_{\pi_i-w-1}-l_{\pi_i-2w})}{w-1}\right)$$

$$E_i^{right} = [l_{\pi_i+w} \ldots l_{\pi_i+2w-1}] - \left(l_{\pi_i+w} + [0 \ldots w-1]\frac{(l_{\pi_i+2w-1}-l_{\pi_i+w})}{w-1}\right)$$

$$E_i = l_{\pi_i-w} + [0 \ldots 2w-1]\frac{(l_{\pi_i+w-1}-l_{\pi_i-w})}{2w-1} + [E_i^{left} \: E_i^{right}]$$

To separate the stripe artifact as defined in step 64 of the algorithm defined in FIG. 7, we subtract the estimated stripe artifact $E_i$ from the corresponding region in L $$P_i=L_{R_i}-E_i$$

and store these profiles for future reference.

Having found the joint profiles $P_i$, we can estimate parameters to modify the joint profiles for correction of the joint artifact in the input image.

Figure 8:
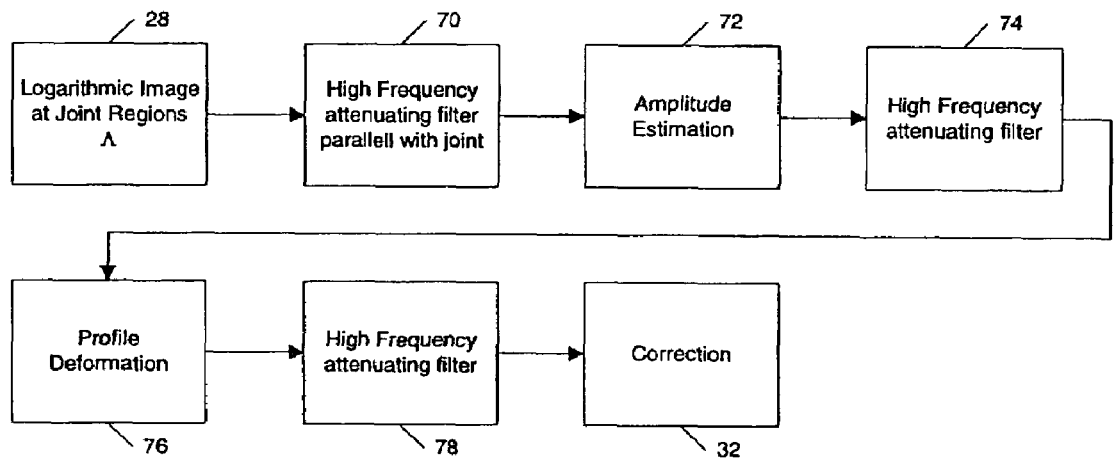
FIG. 8 illustrates the amplitude estimation.

We are now going to focus on steps 28 to 32 of FIG. 5 for which is a more detailed flowchart is displayed in FIG. 8.

In step 28, we transform the extracted input regions Ξ with a logarithmic transform to the logarithmic input image Λ.

In step 70, we apply a high frequency attenuation filter on the input image Λ. This filter is applied along the parallel direction with the joints and its main purpose is to reduce the noise in the input for the parameter estimation.

In step 72, we estimate the scale factor used for multiplication of the joint profile $P_j$ to reduce the joint artifact. This scale factor or amplitude estimation is computed for each row in the input region at each joint position.

After amplitude estimation, we apply a high frequency attenuating filter for the scale factors for each joint (step 74).

After having found the scale factor of the joint profile, we deform the scaled joint profile to minimize the sum of squared differences between the corrected output image and a smoothed version of the corrected output image (step 76).

The found deformation parameters are used as input for a high frequency attenuating filter (step 78). Each deformation parameter of each joint is filtered separately.

In step 32, the filtered scale factors and deformation parameters of steps 74 and 78 are used as input to compute a new joint profile. This computed joint profile is used to correct the logarithmic input image. This step is performed in step 32.

Because the procedures in steps 70, 74, 78 and 32 are well-known techniques, we describe the details of only steps 72 and 76 in the following sections.

Figure 9:
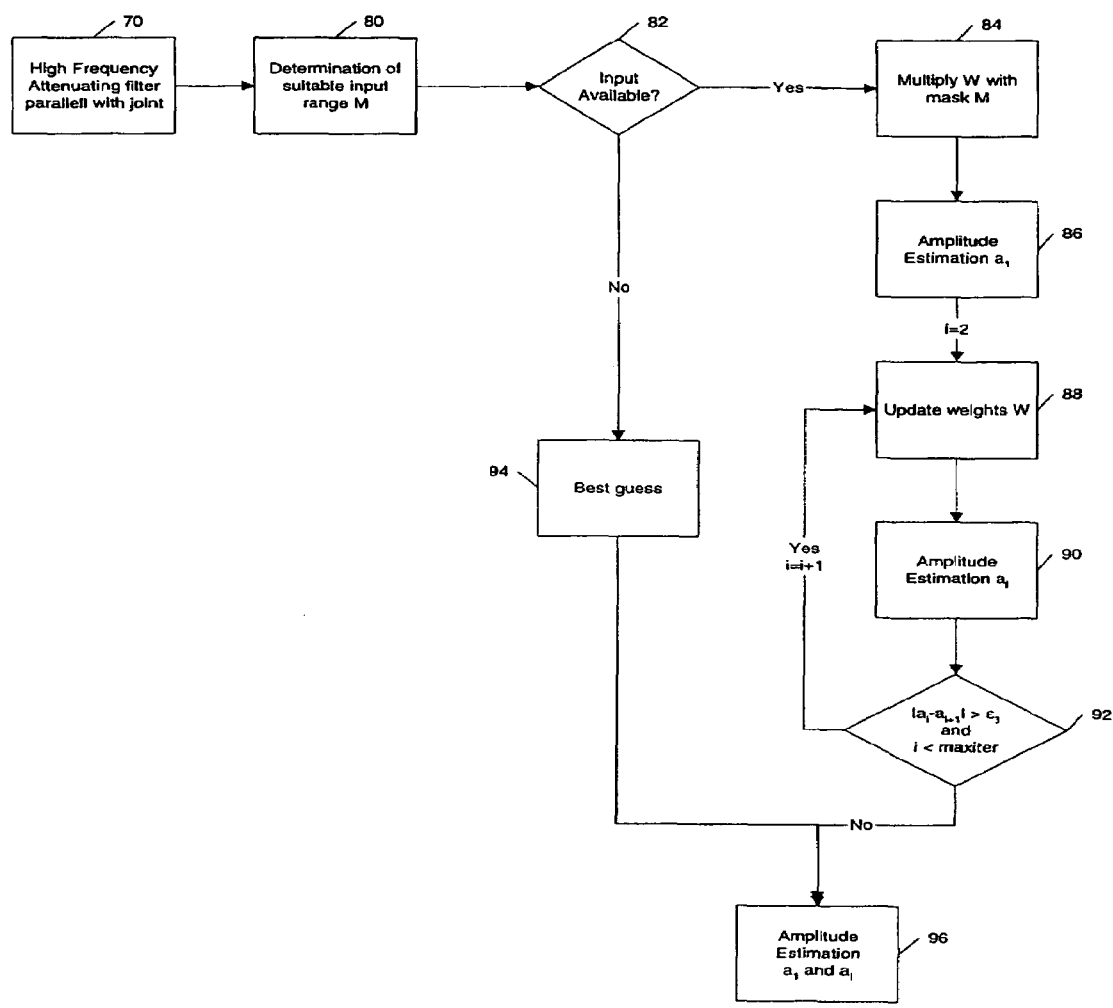
FIG. 9 illustrates the deformation parameter estimation.

FIG. 9 shows the algorithm of the amplitude parameter estimation in more detail.

In step 80, we search for regions which are suitable for estimation of the amplitude of the joint profiles P. We construct a mask M which represents the indices of the input in the current region $R_j$. Pixels which are considered useful for estimation of joint profile amplitude are indicated with a value 1, and the mask is set to 0 at the indices of the pixels in regions where the amplitude estimation is not regarded as safe.

The decision of which region in the input is suitable for amplitude estimation is based on the variability of the signal. Many algorithms exist to determine high variability of input signals, which are often time consuming.

To reduce the complexity of this step, we take some fixed samples at positions $z_i$ in the region $R_j$ around the jth joint.

To simplify the notation, we consider working on one joint and one input row at a time.

If we define the elements $y_i$ of the filtered logarithmic values for joint j as $$\Lambda_j = \log(\Xi_{R_j})$$

$$Y_j = \tilde{\Lambda}_j$$

$$Y_j = [\tilde{\lambda}_{p_j-w}, \ldots, \tilde{\lambda}_{p_j+w-1}] = [y_1, y_2, \ldots y_{2w}]$$ Equation 5 where $\tilde{\circ}$ is a high frequency attenuating operator, and define the elements of the jth joint profile as $$P_j=[p_1, p_2, \ldots, p_{2w}]$$ Equation 6 step 80 transforms to the following definition of the mask for all available input samples $$M = [m_1, m_2, \ldots, m_{2w}]$$ [Equation 7]

$$m_k = \begin{cases} 1: z_i \le k < z_{i+1} \Leftrightarrow \left|1 - \frac{y_{z_i} - y_{z_{i+1}}}{p_{z_i} - p_{z_{i+1}}}\right| < \varepsilon_2 \\ 0: \text{otherwise} \end{cases},$$

wherein $\varepsilon_2$ is a predefined threshold. For those skilled in the art, it is clear that other embodiments of step 80 can be implemented.

In step 82, we check if all elements in the mask M are zero. If this is true, a default value or a best guess is set as the amplitude estimation in step 94. The most obvious default value is 1, because this is the amplitude of the joint profile as estimated in the reference signal.

The mean value of all previously computed amplitudes for this joint is also a good estimate of the amplitude as output of step 94.

Before explaining steps 84 to 92 in more detail, we introduce some formulas to clarify and illustrate the procedure.

First we define the difference of two input values $x_k, x_j$ of a signal X as $$x_{i,j}=x_k-x_j$$

We define the difference Δ of a signal X over a range of n pixels as $$\Delta X=[x_{1,2}, x_{1,3}, \ldots, x_{1,n}, x_{2,3}, \ldots, x_{2,2+n}, \ldots,$$
$$x_{2w-1,2w}]$$ Equation 8

Using Equation 8, we compute the difference Δ of the input signal Y and joint profile $P_j$ over a range of n pixels:

$$\Delta Y = [y_{1,2}, y_{1,3}, \ldots, y_{1,n}, y_{2,3}, \ldots, y_{2,2+n}, \ldots, y_{2w-1,2w}]$$

$$\Delta P_j = [p_{1,2}, p_{1,3}, \ldots, p_{1,n}, p_{2,3}, \ldots, p_{2,2+n}, \ldots, p_{2w-1,2w}]$$

For slowly varying signals $$a = \frac{\Delta Y \cdot \Delta P^T}{\Delta P \cdot \Delta P^T} \qquad \text{Equation 9}$$

is a very good estimate of the amplitude of the pattern P in the input signal Y.

It is clear that the contribution of pixel differences $x_{k,j}$ is more accurate if the distance between k and j $$|k-j|$$

is smaller. Therefore, we assign weights $w_{k,j}$ to the signal differences and positions of equation 9.

The estimate of amplitude in step 86 is $$a = \frac{(W\Delta Q) \cdot (W\Delta P)^T}{(W\Delta P) \cdot (W\Delta P)^T} \qquad \text{Equation 10}$$

where W is defined as $$W = [w_{1,2}, w_{1,3}, \ldots, w_{k,j}, \ldots]$$

with $w_{k,j}$ the weight for the corresponding difference.

Before using the equation 10 in step 86, the weight matrix W is first multiplied in step 84 with the mask M obtained from step 80, to remove the influence of the regions for which we cannot estimate the amplitude accurately.

After having found the first amplitude $a_1$ in step 86 using equation 10, we update the weights of W with following formula $$w_{k,j} = e^{-b|d_{k,j}|}$$

$$D = [d_1, d_2, \ldots] = Y - a_i P \qquad \text{Equation 11}$$

It is clear that different update schemes for equation 11 may be used. Equation 11 favors regions where the variation of the corrected output is small and imposes a large penalty on pixels where the difference between neighboring pixels of the output signal is large.

After updating the weights in step 88, we compute a new estimate of the amplitude in step 90.

If the difference between the consecutive computed amplitudes is larger than a predefined threshold $\epsilon_3$ $$|a_i - a_{i+1}| > \epsilon_3$$

and we did not exceed a predefined maximum number of iterations max iter $$i < \text{max iter},$$

we recomputed the estimate until one of both conditions fails.

Finally, in step 96 we store the initial computed amplitude estimate $a_1$ and the last updated amplitude estimate $a_i$ as output.

If there was no input available, both output values are replaced with the best guess of step 94.

After having found the amplitude of the joint profile and applying a high frequency attenuating filter to its output $a_i$ in step 74, the estimated amplitude is supplied as an input to the profile deformation step in step 76.

Figure 10:
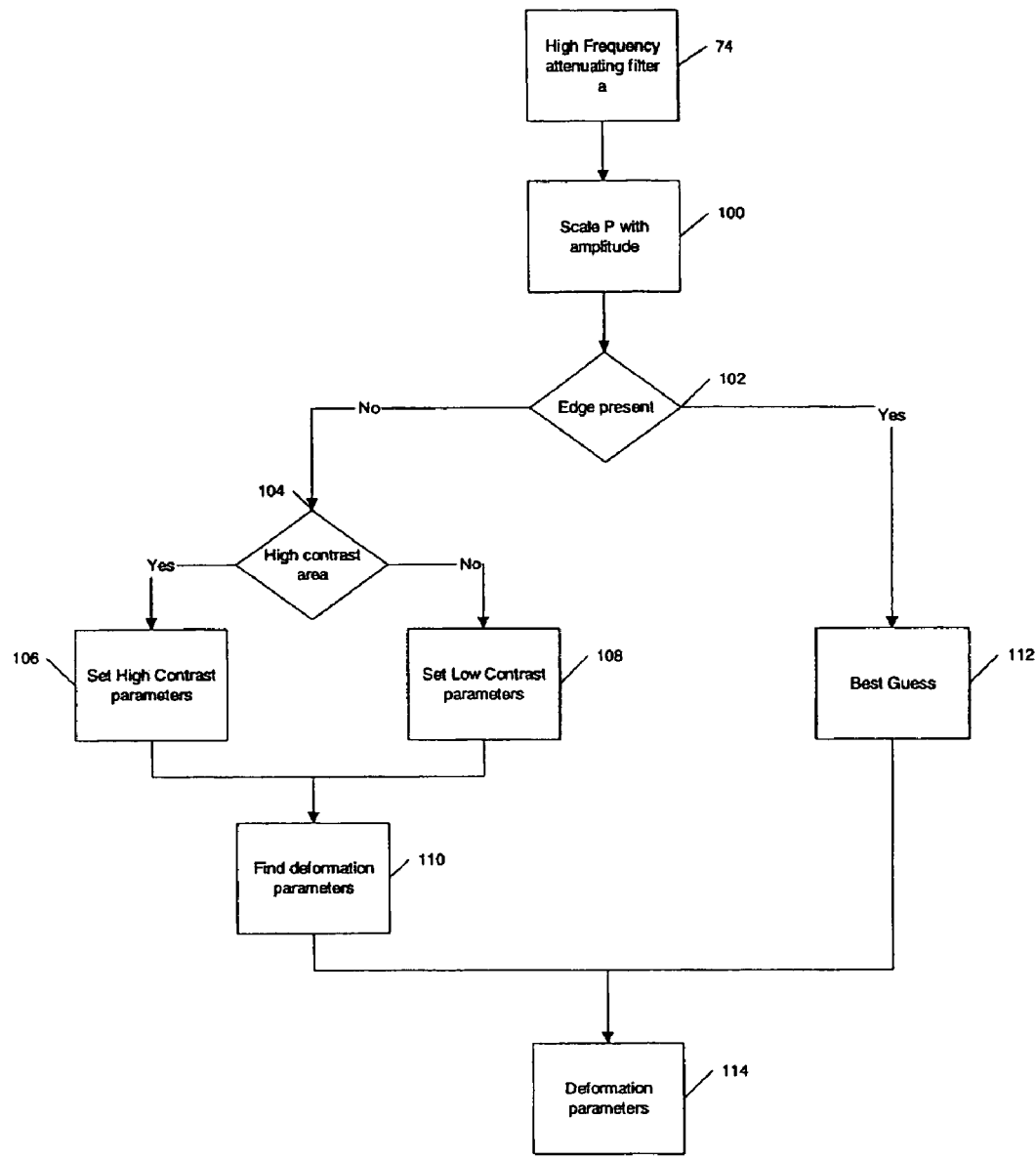
FIG. 10 illustrates the deformation of the joint profile.

Step 76 is worked out in more detail in FIG. 10.

In step 100, the amplitude of step 74 is used to scale the joint profile P.

In step 102, we detect if there is an edge present in the corrected input signal $$Y - \tilde{a}_i P$$

If this is true, we do not want to modify the deformation parameters because of the risk to smoothen the edge a little bit. In this case, a default value or mean of previously computed values is used in step 112.

As in step 80, again numerous techniques exist to perform edge detection. Most of them, however, will be misguided by the presence of the artifact. To reduce this risk, again we take into account the shape of the joint profile and consider an edge to be present if $$\max_i \left| 1 - \frac{y_{z_i} - y_{z_{i+1}}}{p_{z_i} - p_{z_{i+1}}} \right| > \epsilon_4, \qquad \text{Equation 12}$$

with $\epsilon_4$ a predefined threshold.

If equation 12 is false, the deformation parameters will be computed.

The deformation of the profile is implemented in the following manner. We place several key points $s_k$ on the joint profile P which can be shifted to the left or right over a distance $t_k$. By means of interpolation, we construct a new profile Q with a similar shape of the original joint profile P.

Figure 11:
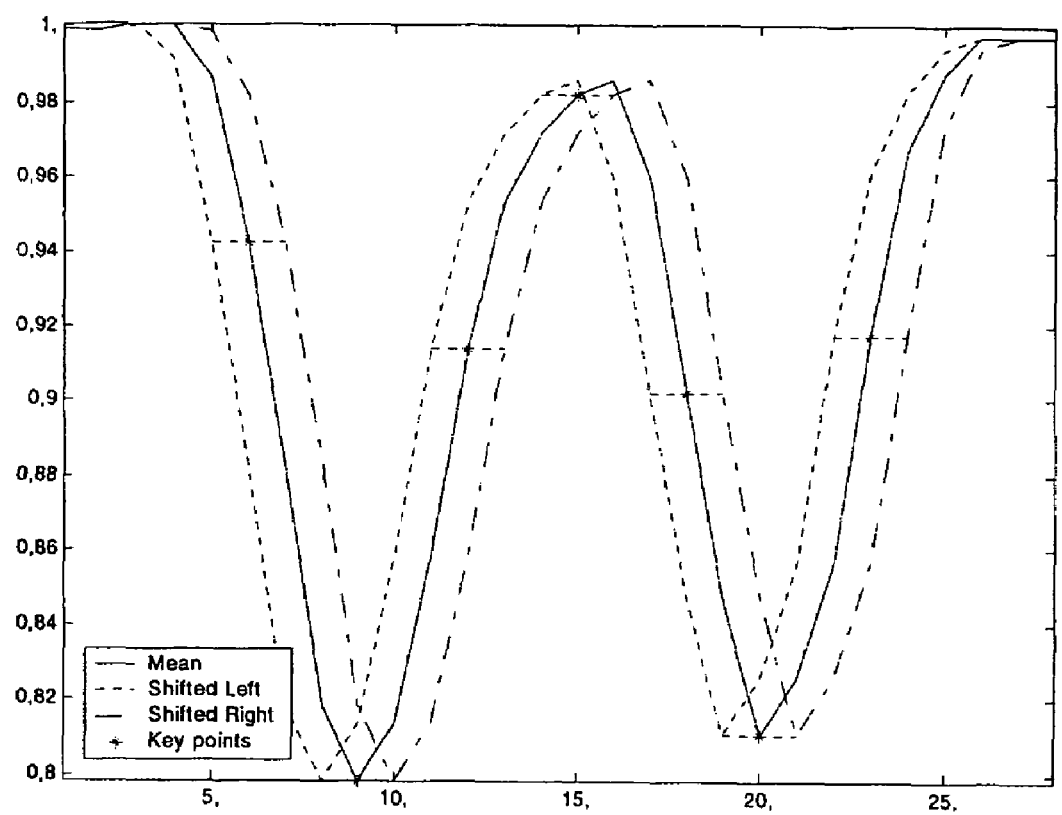
FIG. 11 illustrates a data interpolation technique.

Interpolation techniques are commonly known and the process is illustrated in FIG. 11. Since interpolation techniques have the effect of smoothing the input data, we make sure that we preserve the energy of the original input profile. This can be expressed by the following constraint $$\sum_j q_j = \tilde{a}_i \sum_j p_j \qquad \text{Equation 13}$$

The deformation parameter t are then defined as $$t = \arg\min_{t_k} \|(Y - Q_{t_k}) - \langle Y - Q_{t_k} \rangle\|, \qquad \text{Equation 14}$$

where $\langle \circ \rangle$ is a smoothed version of $\circ$. In step 110, we start a search algorithm to minimize equation 15. Dependent on the contrast in the input signal, we tune the smoothing parameter of the $\langle \rangle$ operator.

One way to achieve a good classification, is to check the ratio between the two estimated amplitudes $a_1$ and $a_i$ of step 96.

If the following condition is true, with $\epsilon_5$ as a predefined threshold, $$\left| 1 - \frac{a_i}{a_1} \right| > \epsilon_5 \qquad \text{Equation 15}$$

the input signal is considered to be a high contrast signal and the amount of smoothing to minimize equation 14 is set to a low amount, otherwise a higher amount of smoothing is used. The combination of steps 110 and 112, gives the final deformation parameters for each joint and each row.

Each deformation parameter $t_k$ of each joint is then supplied as input for a high frequency attenuation step in step 78.

The final step, step 32, corrects the input image signal $\Lambda_{R_j}$ at the joint regions and constructs a joint corrected output image O $$O_{R_j} = \Lambda_{R_j} - Q_{j,t_k}$$

and converts it back to original values using an exponential in step 34. ∎

The invention claimed is:

1. Method of correcting artifacts in an image signal comprising the steps of:
    generating an artifact profile signal in an image processor, to reduce artifacts in a digital image, the artifact profile signal representing an estimation of the contribution of artifacts to a reference signal U, comprising said artifacts, in regions defined around the position of one or more artifact generating elements;
    via the image processor, extracting signal portions in said regions from said image signal;
    generating a new artifact profile signal for correction of said image signal by deforming said artifact profile signal at the image processor and
    using the image processor to correct the image signal that has been subjected to said extraction by means of said new artifact profile signal;
    wherein said new artifact profile signal is generated by the image processor via the following, data transformations for a number of deformed joint profiles:
    subtracting a deformed joint profile from said image signal to obtain a first signal;
    smoothing said first signal to obtain a second signal;
    generating a measure expressing the differences of the first and second signals; and
    selecting as a new artifact profile signal a deformed profile for which said measure is minimal.

2. A method according to claim 1 wherein said new artifact profile signal is obtained by the image processor by subjecting said artifact profile signal to an amplitude deformation by applying a scale factor being generated by an iterative procedure whereby in each iteration step weight factors are taken into account, the values of said weight factors in a current iteration step being dependent on the variation of a correct image signal obtained with the scale factor obtained in the previous iteration step.

3. A method according to claim 2 wherein the image processor terminates said iterative procedure when the difference of amplitudes obtained during successive iteration steps is lower than a set threshold.

4. A method according to claim 1 wherein smoothing said first signal includes using smoothing parameters, the smoothing parameters depending on the variation of said image signal.

* * * * *